(12) United States Patent
Wang et al.

(10) Patent No.: US 11,796,417 B1
(45) Date of Patent: Oct. 24, 2023

(54) SITE EFFECT SIMULATOR (71) Applicant: Institute of Engineering Mechanics, China Earthquake Administration, Heilongjiang Province (CN)

(72) Inventors: Tao Wang, Heilongjiang Province (CN); Xiaoting Wang, Heilongjiang Province (CN); Qingxue Shang, Heilongjiang Province (CN); Zhongyi Zhou, Heilongjiang Province (CN); Jichao Li, Heilongjiang Province (CN); Rui Teng, Heilongjiang Province (CN)

(73) Assignee: INSTITUTE OF ENGINEERING MECHANICS, CHINA EARTHQUAKE ADMINISTRATION, Heilongjiang Province (CN)

( * ) Notice: Subject to any disclaimer, the term of this patent is extended or adjusted under 35 U.S.C. 154(b) by 0 days.

(21) Appl. No.: 18/192,801

(22) Filed: Mar. 30, 2023

(30) Foreign Application Priority Data

May 31, 2022 (CN) .......................... 202210608102.6

(51) Int. Cl.
*G01M 7/06* (2006.01)
(52) U.S. Cl.
CPC ..................... *G01M 7/06* (2013.01)
(58) Field of Classification Search
CPC ............ G01M 7/06; G01M 7/08; G01M 7/00; G01M 7/02
See application file for complete search history.

(56) References Cited

U.S. PATENT DOCUMENTS

| 4,446,742 A * | 5/1984 | Thompson, Jr. | B06B 1/10 73/665 |
| 4,800,748 A * | 1/1989 | Fischer | G01M 17/10 73/146 |
| 11,311,954 B2 * | 4/2022 | Sakaguchi | B23H 7/02 |

OTHER PUBLICATIONS

CN language Office Action dated Oct. 25, 2022 in application No. 202210608102.6.
English language translation of search report issued in CN application No. 202210608102.6.
English language translation of CN Office Action dated Oct. 25, 2022 in application No. 202210608102.6.
Chinese language amendment/response filed in response to Office action dated Oct. 25, 2022 issued in Application 202210608102.6.

(Continued)

*Primary Examiner* — Suman K Nath
(74) *Attorney, Agent, or Firm* — McClure, Qualey & Rodack, LLP (57) ABSTRACT

A site effect simulator, including a site effect simulator base plate, where counter-force pillars are vertically arranged at diagonals of the site effect simulator base plate, the counter-force walls are connected to counter-force pillars along two sides of the site effect simulator base plate, a plurality of single-layer soil boxes are arranged at the inner side of the site effect simulator base plate, wave-absorbing materials are arranged inside single-layer soil boxes, and sliding panels are arranged at an upper side and a lower side of each single-layer soil box. The present disclosure does not need to rely on other counter-force frames, has the characteristics of flexible use, and can be randomly placed, and the height can be adjusted randomly. With a servo hydraulic actuator with three directions and six degrees of freedom, seismic simulation tests can be realized independently.

6 Claims, 8 Drawing Sheets

(56) References Cited

OTHER PUBLICATIONS

Claim replacement sheet issued in Chinese application 202210608102.6.
English language translation of amendment/response filed in response to Office action dated Oct. 25, 2022 issued in Application 202210608102.6.
English translation of claim replacement sheet issued in Chinese application 202210608102.6.
Chinese Language Notice of Allowance dated Dec. 28, 2022 issued in Application 202210608102.6.
English translation of Notice of Allowance dated Dec. 28, 2022 issued in Application 202210608102.6.

* cited by examiner

FIGURE 12

SITE EFFECT SIMULATOR

TECHNICAL FIELD

The present disclosure relates to the technical field of soil dynamic research, in particular to a site effect simulator.

BACKGROUND

The present disclosure belongs to a simulation instrument for soil dynamic research, and relates to a self-balancing device with a counter-force system and capable of freely adjusting number of layers of a soil box, and having a servo hydraulic actuator with three directions and six degrees of freedom, a site effect vibration instrument can be truly simulated. The present disclosure aims at breaking through the limitation of a traditional laminated soil box in soil dynamic research, and provides a novel instrument capable of simulating a soil dynamic test research. Compared with the traditional laminated soil box of a vibration table, the instrument has a more real boundary state and can reproduce a site vibration state more truly, and at the same time, the instrument does not need to depend on the vibration table for a seismic simulation test. A seismic wave may be reproduced by itself, thereby providing a more excellent platform for the soil dynamic test research.

In view of the above, we propose a site effect simulator to solve the above problems.

SUMMARY

The technical problem to be solved by the the present disclosure is to overcome the above technical defects and provide a site effect simulator with a reasonable structure, strong practicability and a good using effect.

In order to solve the above technical problem, the present disclosure provides the technical solution: a site effect simulator, including a site effect simulator base plate, counter-force pillars are vertically arranged at diagonals of the site effect simulator base plate, the counter-force walls are connected to the counter-force pillars along two sides of the site effect simulator base plate, a plurality of single-layer soil boxes are arranged at the inner side of the site effect simulator base plate, an outer ring of each single-layer soil box is designed as an octagonal structure, inner sides are internally formed at diagonal ends of the single-layer soil boxes, the sides formed internally in diagonal directions of the single-layer soil boxes are connected to the counter-force pillars via horizontal servo hydraulic actuators, and the bottom of the single-layer soil box at a bottom layer is connected to the site effect simulator base plate via vertical servo hydraulic actuators; and wave-absorbing materials are arranged inside the single-layer soil boxes can can absorb excess energy transferred to the materials from the soil layers and to simulate more real boundary conditions, sliding panels are arranged at upper sides and lower sides of the single-layer soil boxes, with small surface friction coefficients and high smoothness.

Further, actuator connecting plates arranged at two ends of each horizontal servo hydraulic actuator, and the horizontal servo hydraulic actuators are connected to outer walls of the single-layer soil boxes via the actuator connecting plates.

Further, the site effect simulator base plate is in rigid connection with actuator counter-force walls and actuator counter-force pillars, so as to provide counter force for the horizontal servo hydraulic actuators and the vertical servo hydraulic actuators.

Further, the site effect simulator base plate is surrounded by detachable lifting devices.

Further, the vertical servo hydraulic actuators are arranged at four corners of a bottom surface of the single-layer soil box at a lower layer.

Further, universal joint connecting seats are arranged at two ends of horizontal servo hydraulic actuators and two ends of vertical servo hydraulic actuators.

Compared with the prior art, the the present disclosure has the following advantages: with combination of hydraulic servo actuators and the laminated soil boxes, a novel instrument capable of simulating the soil dynamic test research is designed; and compared with the laminated soil box of the traditional vibration table, the instrument has a more real boundary state and can reproduce a site vibration state more truly, and at the same time, the instrument does not need to depend on the vibration table for a seismic simulation test. A seismic wave may be reproduced by itself, thereby providing a more excellent platform for the soil dynamic test research. The number of layers of the single-layer soil box can be increased or decreased freely to meet the demands of different soil layer heights. Compared with the traditional laminated soil box, the inner wall of each single-layer soil box in the present disclosure is provided with wave absorbing materials, and the horizontal actuators in two directions also can provide horizontal damping, and boundary conditions of an actual state can be simulated more truly. The servo hydraulic actuator with three directions and six degrees of freedom provided by the present disclosure is controlled through the controller, thereby achieving the vibration of the soil box in six degrees of freedom. Compared with the traditional laminated soil box, the vibration table is not required to perform the soil dynamic test research, and the seismic simulation vibration may be tested freely in the present disclosure. A plurality of site effect simulators may be used in parallel and controlled through the same controller, so that the linkage effect of the plurality of site effect simulators can be synchronized better, thereby providing a reliable platform for the study of complicated structures, such as multi-span bridges, underground tunnels and underground immersed tubes.

As shown in the figure: 1. Single-layer soil box; 2. Wave-absorbing material; 3. Soil box base plate; 4. Site effect simulator base plate; 5. Vertical servo hydraulic actuator; 6. Horizontal servo hydraulic actuator; 7. Counter-force wall; 8. Counter-force pillar; I. Control computer, II. Controller, III. Site effect simulator.

DETAILED DESCRIPTION

The specific embodiments of the present disclosure will be further described below in combination with the drawings. The same parts are indicated by the same reference numerals.

Figure 1:
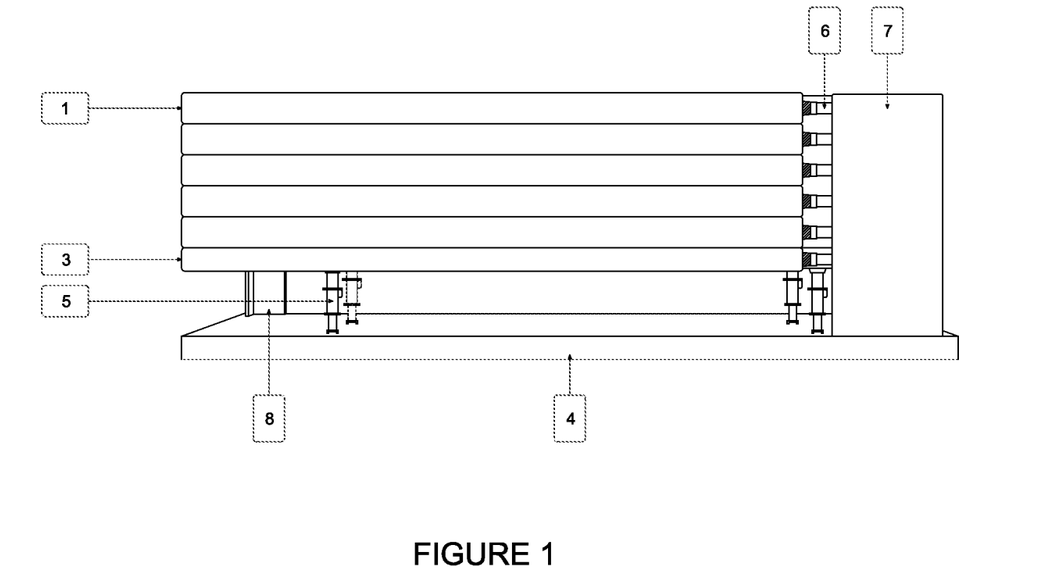
FIG. 1 is a front view of a structure in an embodiment of the present disclosure.

The site effect simulator provided by the the present disclosure, including single-layer soil boxes 1, where special wave-absorbing materials 2 are installed inside the single-layer soil boxes 1, and the materials can absorb excess energy transferred to the materials from the soil layer, and simulate more real boundary conditions; sliding panels 1-1 are arranged at upper sides and lower sides of the single-layer soil boxes 1, with small surface friction coefficients and high smoothness. With a shape of a special octagonal design, each single-layer soil box 1 is in matching connection with the horizontal actuators; actuator connecting plates 1-3 are provided; a plurality of single-layer soil boxes 1 can be stacked, and any number of layers can be placed according to the usage demands;

the site effect simulator is provided with a counter-force device, and as a part of the site effect simulator system, the actuator is a set of self-balancing device. The present disclosure does not depend on other counter-force frames, has the characteristics of flexible use, and can be placed randomly, and the height can be randomly adjusted; having the servo hydraulic actuator with three directions and six degrees of freedom, seismic simulation tests can be achieved independently; horizontal actuators in horizontal X and Y directions may also play a damping effect, providing strong damping for simulating a real boundary of the soil layer. The site effect simulator provided by the present disclosure is a set of independent self-balancing device, without depending on other counter-force systems or other hydraulic systems; and the site effect simulator is flexible to use, and can be assembled freely, or a plurality of site effect simulators can be used online;

FIG. 1 is an overall schematic diagram of the embodiment. The embodiment is composed of single-layer soil boxes 1, wave-absorbing materials 2, a soil box base plate 3, a site effect simulator base plate 4, vertical servo hydraulic actuators 5, horizontal servo hydraulic actuators 6, counter-force walls 7 and counter-force pillars 8. During assembly, the site effect simulator base plate 4 is welded between the counter-force walls 7 and the counter-force pillars 8 through a steel structure, ensuring the welding intensity. Welding is performed in a maximum precision during welding installation. The four vertical servo hydraulic actuators 5 are installed on the actuator connecting plates 4-4 at an upper part of the site effect simulator base plate 4. Bolt connection is adopted for installation. The national standard 12.9 ultra-high strength bolt is adopted. After installation is completed, the soil box base plate 3 is installed on the four vertical servo hydraulic actuators 5, bolt connection is adopted, and the national standard 12.9 ultra-high strength bolt is adopted. After connection, the wave-absorbing materials 2 are installed on inner walls of the single-layer soil boxes 1, and the single-layer soil boxes 1 installed with the wave-absorbing materials 2 are installed in an installation groove 3-1 of the soil box base plate 3. The single-layer soil boxes 1 may be installed with different layers according to the usage demands. Each layer is completely of an independent structure. After the single-layer soil boxes 1 are installed, the horizontal servo hydraulic actuators 6 can be installed, the horizontal direction is divided into an X direction and a Y direction, every two horizontal servo hydraulic actuators 6 are installed in each direction, fixed ends of the horizontal servo hydraulic actuators 6 are connected to connecting plates 4-2 on the counter-force pillars 8, the national standard 12.9 ultra-high strength bolt is adopted for connection, movable ends of the horizontal servo hydraulic actuators 6 are hinged with the connecting plates 3-4 on the single-layer soil boxes 1 for bolt connection, and the national standard 12.9 ultra-high strength bolt is adopted for connection.

Figure 2:
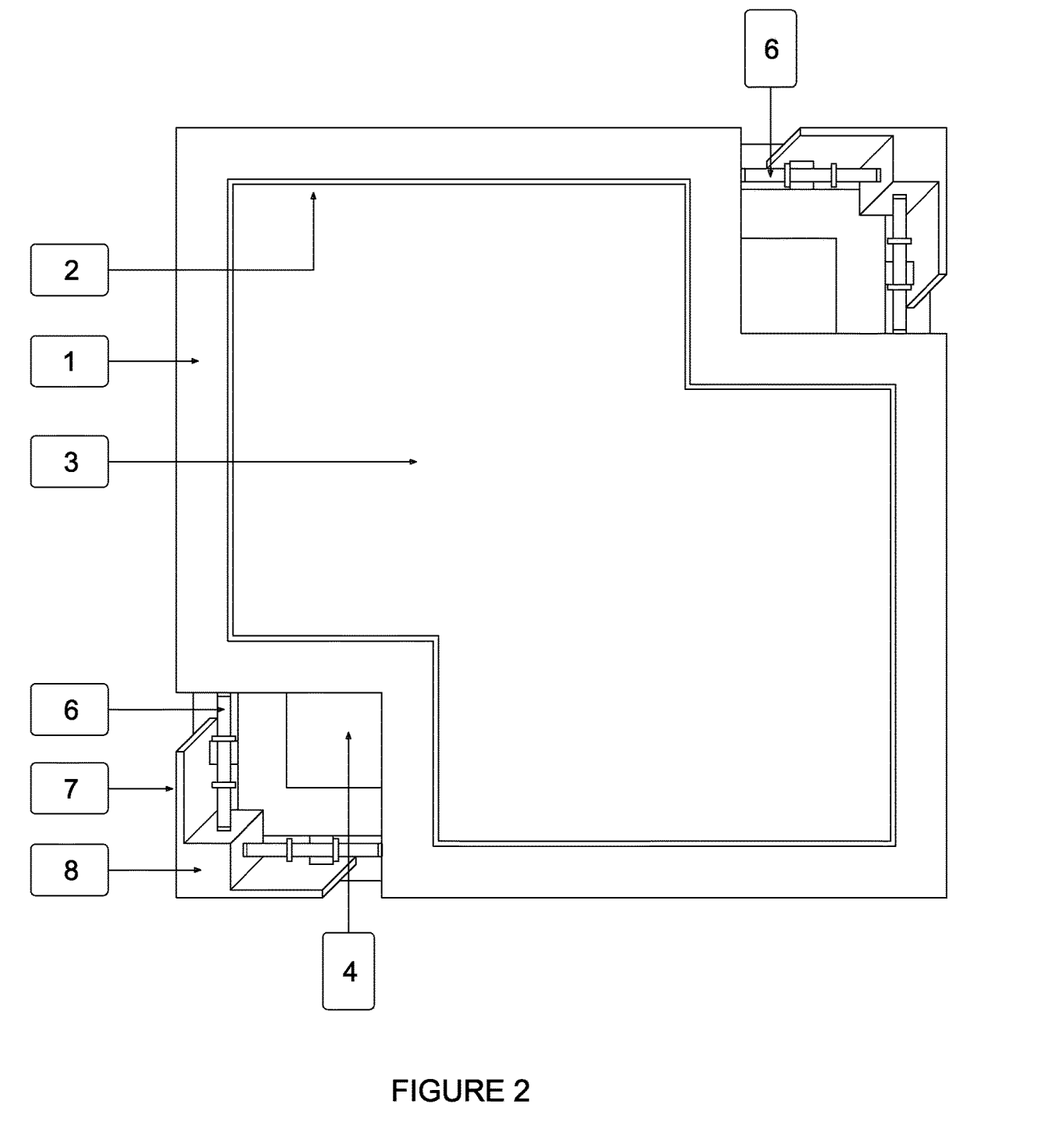
FIG. 2 is a top view of a structure in an embodiment of the present disclosure.

FIG. 2 is a top view of a structure of the embodiment. From an aspect of the top view, an arrangement mode of the horizontal servo hydraulic actuators 6 in X and Y directions may be seen clearly. Through this arrangement, the horizontal translation of the single-layer soil boxes 1 in the X and Y directions can be actively controlled. The single-layer soil boxes 1 are stacked, and a contact surface of an upper single-layer soil box and a lower single-layer soil box is a sliding panel 1-1.

Figure 3:
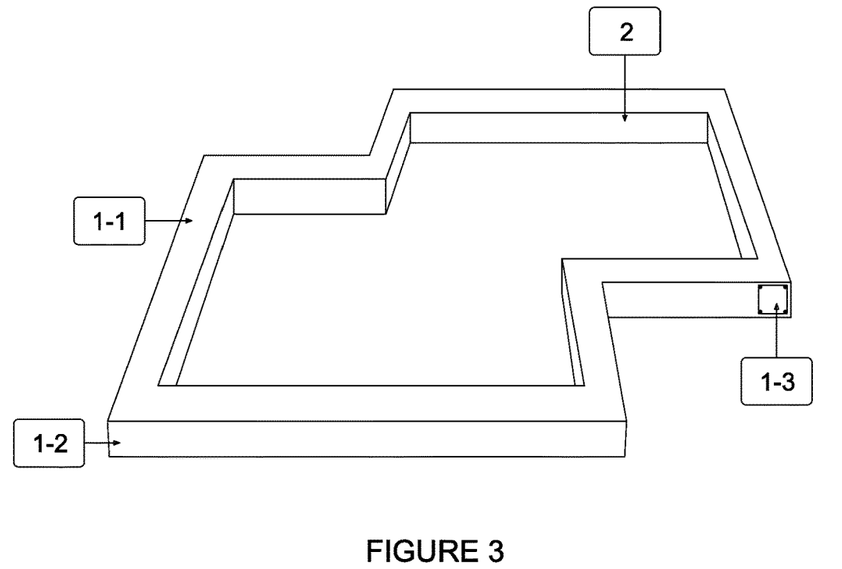
FIG. 3 is a schematic diagram of a single-layer soil box 1 in an embodiment of the present disclosure.

FIG. 3 is a schematic diagram of a single-layer soil box 1 of the embodiment, and the single-layer soil box 1 is composed of a sliding panel 1-1, wave-absorbing materials 2, a single-layer soil box outer wall 1-2, and actuator connecting plates 1-3. The single-layer soil box 1 is formed by welding a steel structure, and stiffening ribs are arranged inside the single-layer soil box 1, ensuring the whole rigidity of the single-layer soil box 1, and the single-layer soil box 1 is made of Q345 steel.

Figure 4:
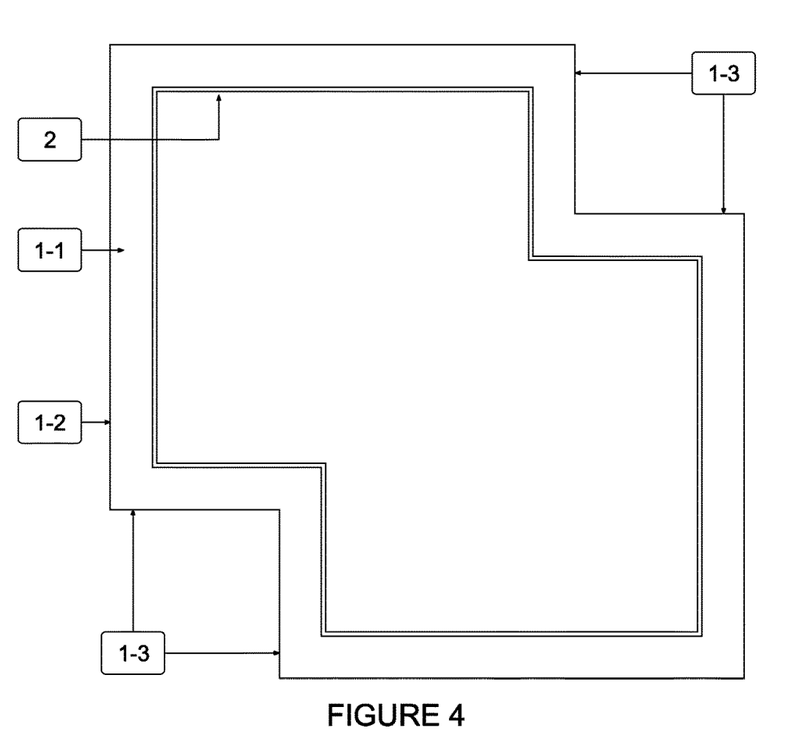
FIG. 4 is a top view of a single-layer soil box 1 in an embodiment of the present disclosure.

FIG. 4 is a top view of a single-layer soil box 1 in an embodiment 1, and the single-layer soil boxes 1 are stacked.

Figure 5:
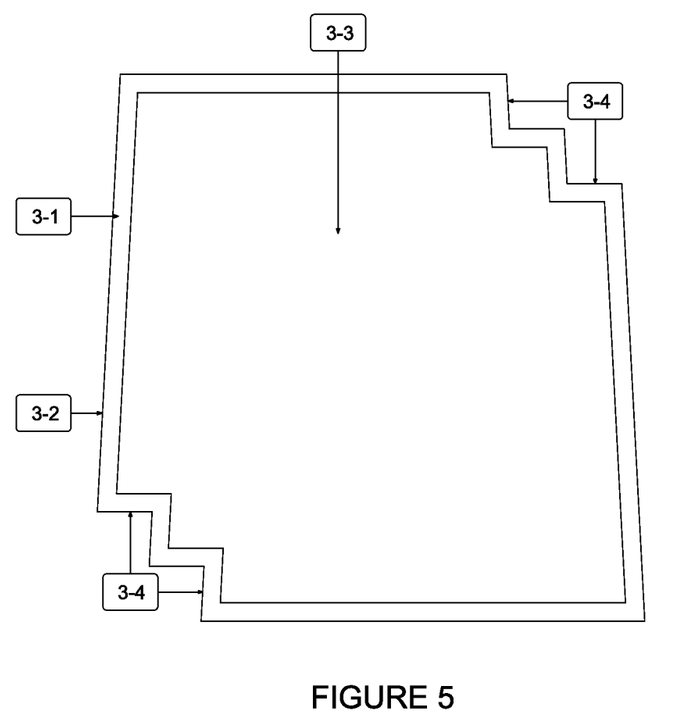
FIG. 5 is a schematic diagram of a soil box base plate 3 in an embodiment of the present disclosure.

FIG. 5 is a schematic diagram of a soil box base plate 3 in the embodiment, and the soil box base plate 3 is composed of a soil box installation groove 3-1, a soil box base plate outer wall 3-2, a soil box base plate soil-bearing plate 3-3, horizontal actuator connecting plates 3-4 (two in X direction, and two in Y direction), and vertical actuator connecting plates 3-4 (four in total). The soil box base plate 3 is integrally welded and formed through Q345 steel, and the overall rigidity meets the designed force-bearing requirement. The overall processing precision reaches the maximum level, and the surface flatness is less than or equal to 0.5 mm.

Figure 6:
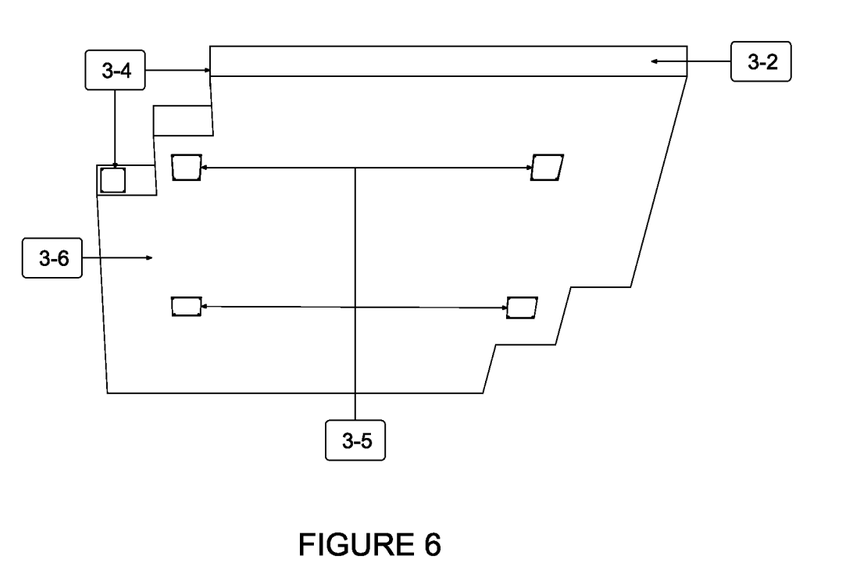
FIG. 6 is a top view of a soil box base plate 3 in an embodiment of the present disclosure.

FIG. 6 is a top view of a soil box base plate 3 in the embodiment, and four vertical actuator connecting plates 3-5 are installed below the soil box base plate 3.

Figure 7:
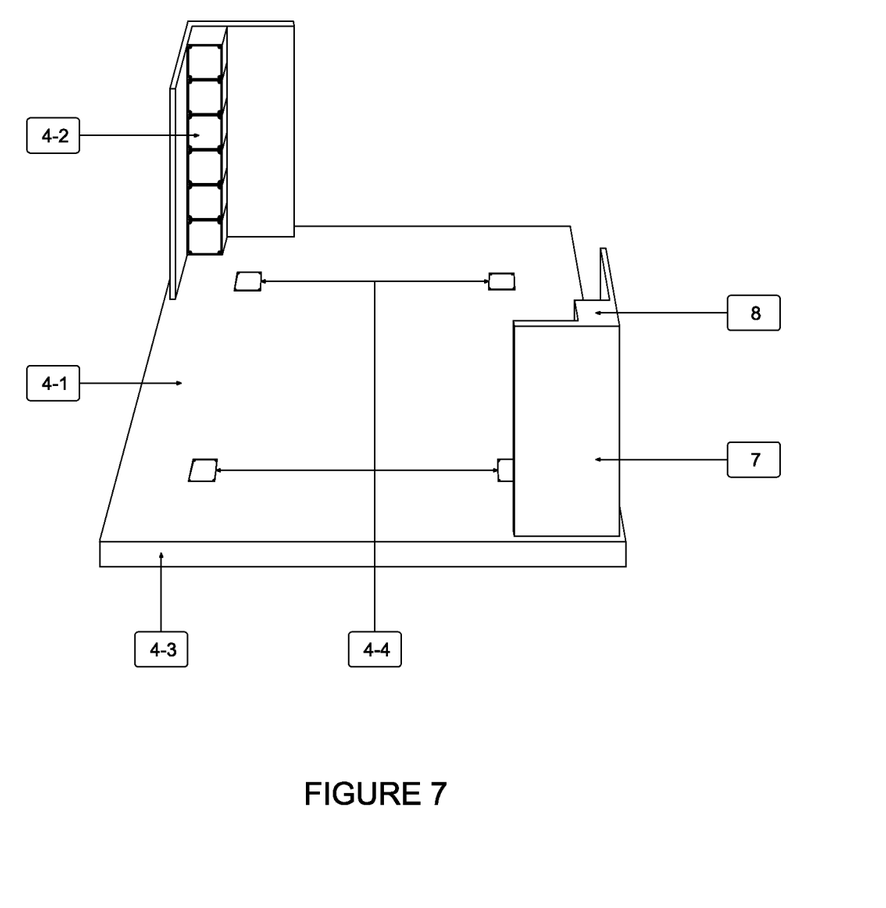
FIG. 7 is a schematic diagram of a base plate and a counter-force device in an embodiment of the present disclosure.

FIG. 7 is a schematic diagram of a base plate and a counter-force device in the embodiment. The site effect simulator base plate 4 and the counter-force device are composed of site effect simulator bottom surfaces 4-1, horizontal actuator connecting plates 4-2, lifting holes 4-3, vertical actuator connecting plates 4-4, bottom supports 4-5, bottom surfaces 4-6, counter-force walls 7 and counter-force pillars 8. The site effect simulator base plate 4 and the counter-force device are formed by welding Q345 steel. The overall rigidity meets the designed force-bearing requirement. The overall processing precision reaches the maximum level, and the surface flatness is less than or equal to 0.5 mm.

Figure 8:
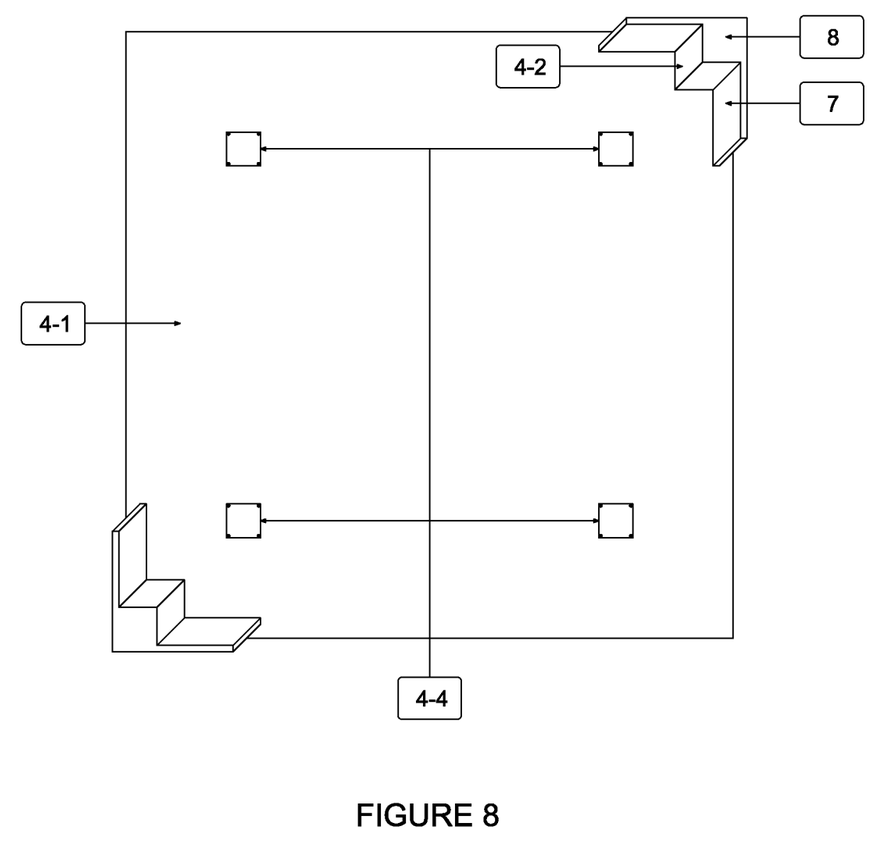
FIG. 8 is a top view of a base plate and a counter-force device in an embodiment of the present disclosure.

FIG. 8 is a top view of a base plate and a counter-force device in the embodiment. The counter-force walls 7 and the counter-force pillars 8 are installed at square diagonals of the site effect simulator bottom surfaces 4-1. The counter-force device is reasonable, has stronger load-bearing ability, and can provide counter-force for the vibration of the soil box.

Figure 9:
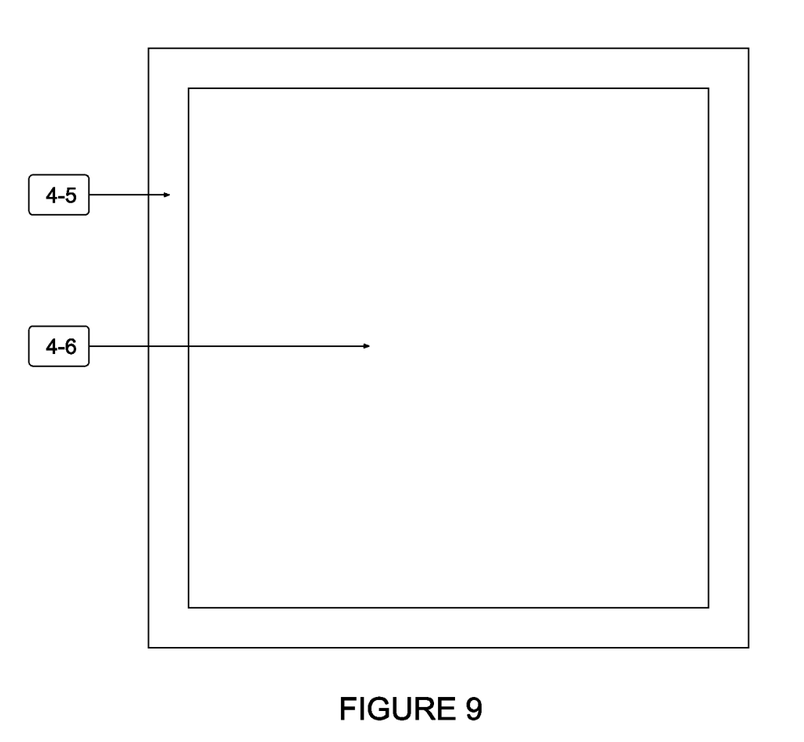
FIG. 9 is a top view of a base plate and a counter-force device in an embodiment of the present disclosure.

FIG. 9 is a top view of a base plate and a counter-force device in the embodiment. The whole bottom construction is composed of bottom supports 4-5 and bottom surfaces 4-6. The whole construction is flat. In the embodiment of the present disclosure, the actuator, the soil box and the site effect simulator counter-force system form an independent structure, which is a set of self-balancing device. The present disclosure does not need to depend on other counter-force frames, has the characteristics of flexible use, and can be placed randomly, and the height can be adjusted randomly. These characteristics are not available on other fixed equipment.

Figure 10:
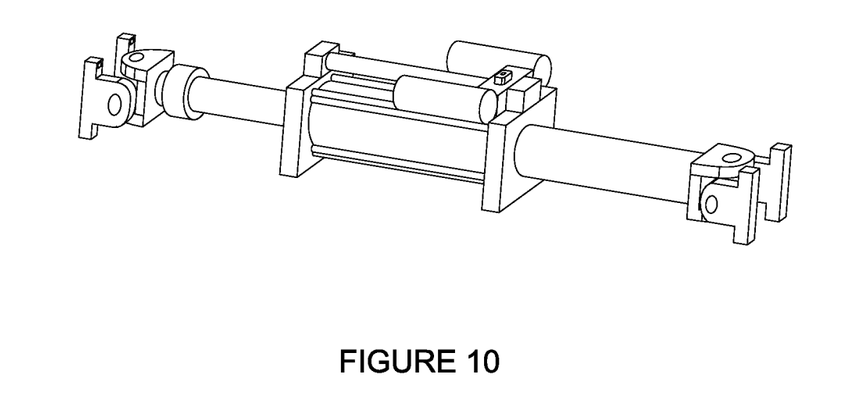
FIG. 10 is a schematic diagram of a servo hydraulic actuator used in an embodiment of the present disclosure.

FIG. 10 is a schematic diagram of a servo hydraulic actuator used in the embodiment of the present disclosure. The parameters of the selected actuators are as follows: servo hydraulic control, dynamic response, speed at 100 mm/s, a three-stage valve body, and high frequency feedback for force signals and displacement signals.

Figure 11:
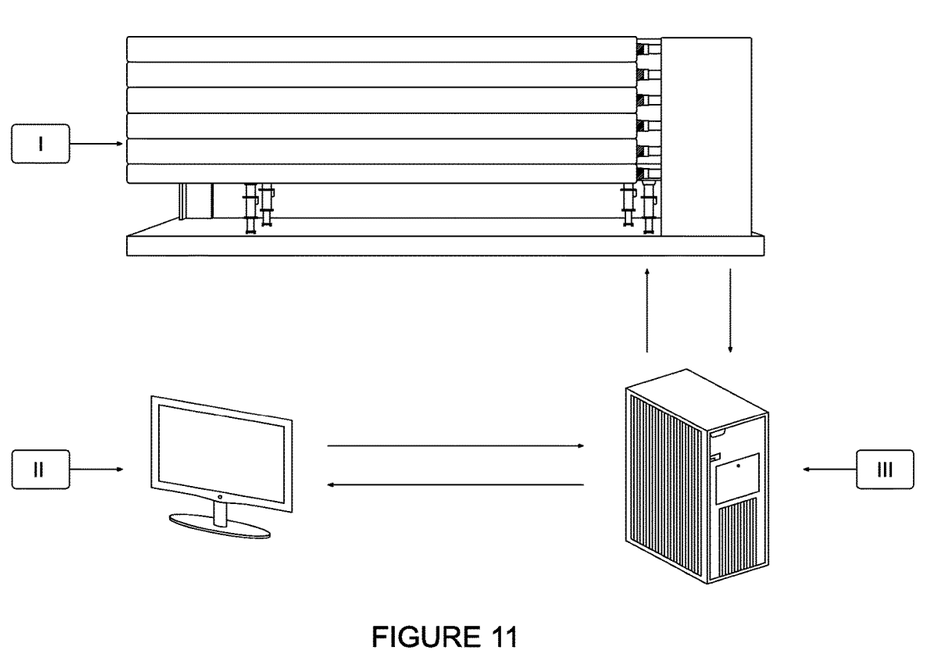
FIG. 11 is a working principle schematic diagram of an embodiment of the present disclosure.

FIG. 11 is a working principle schematic diagram of an embodiment of the present disclosure. In the figure, the embodiment is composed of a site effect simulator I, a control computer II and a controller III. The controller III controls various actuators of the site effect simulator, and collects various signals of the site effect simulator. The collected data is sent to the control computer II for processing.

The control computer runs a control procedure to analyze and process all signals. A seismic wave is sent to control the site effect simulator I by the controller III, thereby achieving the autonomous vibration of the site effect simulator, and simulating the site effect independently.

Figure 12:
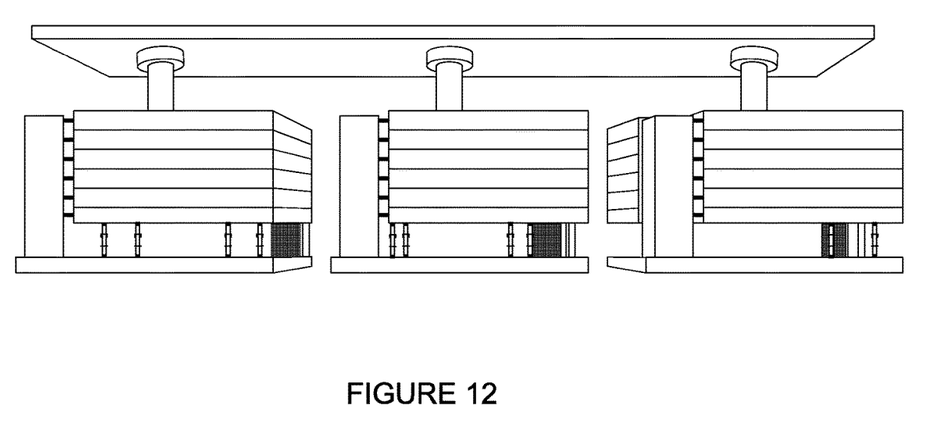
FIG. 12 is a schematic diagram of online working of a plurality of simulators in an embodiment of the present disclosure.

FIG. 12 is an online working schematic diagram of a plurality of simulators in an embodiment of the present disclosure. With the advantages of self-balancing, self-vibration, a capacity to lift and assemble freely and online use of a plurality of simulators, a plurality of site effect simulators can be connected in parallel, and the the present disclosure can provide a reliable platform for the soil dynamic test research.

The present disclosure and embodiments thereof are described above without limitations. The specific embodiments only show some embodiments rather than all embodiments, and the actual structure is not limited to this. In short, if enlightened, those ordinary skill in the art may design the structure modes and embodiments that are similar to this technical solution without departing from the creation objectives of the present disclosure and without creation, and they all fall within the protective scope of the the present disclosure.

The invention claimed is:

1. A site effect simulator, comprising: a site effect simulator base plate, wherein counter-force pillars are vertically arranged at diagonals of the site effect simulator base plate, the counter-force walls are connected to the counter-force pillars along two sides of the site effect simulator base plate, a plurality of single-layer soil boxes are arranged at the inner side of the site effect simulator base plate, an outer ring of each single-layer soil box is designed as an octagonal structure, diagonal ends of the single-layer soil boxes are internally formed with two sides, the sides formed internally in diagonal directions of the single-layer soil boxes are connected to the counter-force pillars via horizontal servo hydraulic actuators, and bottoms of the single-layer soil boxes at a bottom layer are connected to the site effect simulator base plate via vertical servo hydraulic actuators; and wave-absorbing materials are arranged inside the single-layer soil boxes and absorbs excess energy transferred to the materials from the soil layers to simulate more real boundary conditions, and sliding panels are arranged at upper sides and lower sides of the single-layer soil boxes.

2. The site effect simulator according to claim 1, wherein actuator connecting plates are arranged at two ends of each horizontal servo hydraulic actuator, and the horizontal servo hydraulic actuators are connected to outer walls of the single-layer soil boxes via the actuator connecting plates.

3. The site effect simulator according to claim 1, wherein the site effect simulator base plate is in rigid connection with the counter-force walls and the counter-force pillars, providing counter-force for the horizontal servo hydraulic actuators and the vertical servo hydraulic actuators.

4. The site effect simulator according to claim 1, wherein the site effect simulator base plate is surrounded by detachable lifting devices.

5. The site effect simulator according to claim 1, wherein the vertical servo hydraulic actuators are arranged at four corners of a bottom surface of one of the single-layer soil boxes at a lower layer.

6. The site effect simulator according to claim 1, wherein universal joint connecting seats are arranged at two ends of horizontal servo hydraulic actuator and two ends of vertical servo hydraulic actuator.

* * * * *